(12) United States Patent
Gupta (10) Patent No.: US 9,924,401 B2
(45) Date of Patent: *Mar. 20, 2018

(54) ANDSF PARAMETERS FOR WLAN NETWORK SELECTION

(71) Applicant: Intel Corporation, Santa Clara, CA (US)

(72) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,236

(22) Filed: Oct. 5, 2016

(65) Prior Publication Data

US 2017/0026868 A1  Jan. 26, 2017

Related U.S. Application Data

(63) Continuation of application No. 13/830,465, filed on Mar. 14, 2013, now Pat. No. 9,497,740.

(Continued)

(51) Int. Cl.
*H04W 28/02* (2009.01)
*H04W 48/14* (2009.01)
(Continued)

(52) U.S. Cl.
CPC .......... *H04W 28/0221* (2013.01); *H04B 5/00* (2013.01); *H04L 65/4084* (2013.01);
(Continued)

(58) Field of Classification Search
CPC . H04W 28/08; H04W 48/20; H04W 72/0486; H04W 72/0406; H04W 4/005;
(Continued)

(56) References Cited

U.S. PATENT DOCUMENTS

2012/0196644 A1   8/2012   Scherzer et al.
2012/0324100 A1  12/2012   Tomici et al.
(Continued)

FOREIGN PATENT DOCUMENTS

WO    2007/044179 A1    4/2007
WO    2012/033774       3/2012

OTHER PUBLICATIONS

Orlandi, et al., "Wi-Fi Roaming—Building on ANDSF and Hotspot 2.0," Alcatel Lucent Bell Labs, BT Innovate and Design, Feb. 2012, www.alcatel-lucent.com, 45 pages.

(Continued)

*Primary Examiner* — Kan Yuen
*Assistant Examiner* — Richard Chang
(74) *Attorney, Agent, or Firm* — Schwabe, Williamson & Wyatt, P.C.

(57) ABSTRACT

Embodiments describe systems, methods, and apparatuses for identifying, based at least in part on an access network discovery and selection function (ANDSF) quality of service (QoS) policy, a preferred access point (AP) of a wireless local area network (WLAN). In some embodiments, the ANDSF QoS policy may be compared to one or more of an air-interface congestion parameter of the AP, and/or a backhaul congestion parameter of the AP.

20 Claims, 5 Drawing Sheets

Related U.S. Application Data (60) Provisional application No. 61/707,784, filed on Sep. 28, 2012.

(51) Int. Cl.

| | | |
|---|---|---|
| *H04W 72/04* | (2009.01) | |
| *H04W 76/04* | (2009.01) | |
| *H04L 29/06* | (2006.01) | |
| *H04W 52/02* | (2009.01) | |
| *H04W 40/00* | (2009.01) | |
| *H04W 76/06* | (2009.01) | |
| *H04B 5/00* | (2006.01) | |
| *H04W 4/00* | (2018.01) | |
| *H04W 40/24* | (2009.01) | |
| *H04W 52/04* | (2009.01) | |
| *H04W 36/08* | (2009.01) | |
| *H04W 48/18* | (2009.01) | |

(52) U.S. Cl.
CPC ........... *H04L 65/608* (2013.01); *H04W 4/005* (2013.01); *H04W 40/005* (2013.01); *H04W 40/246* (2013.01); *H04W 48/14* (2013.01); *H04W 52/0209* (2013.01); *H04W 52/0212* (2013.01); *H04W 52/0225* (2013.01); *H04W 52/0235* (2013.01); *H04W 52/0258* (2013.01); *H04W 52/04* (2013.01); *H04W 72/0406* (2013.01); *H04W 76/048* (2013.01); *H04W 76/06* (2013.01); *H04W 36/08* (2013.01); *H04W 48/18* (2013.01); *H04W 52/0261* (2013.01); *Y02B 60/50* (2013.01)

(58) Field of Classification Search
CPC ..... H04W 48/14; H04W 48/18; H04W 36/08; H04W 52/0209; H04W 52/0212; H04W 52/0225; H04W 52/0235; H04W 52/0258; H04W 52/0261; H04W 52/04; H04W 76/048; H04W 76/06; H04W 40/246; Y02B 60/50; H04L 65/4084; H04L 65/6028; H04L 65/608; H04B 5/00
USPC .......................................................... 370/229
See application file for complete search history.

(56) References Cited

U.S. PATENT DOCUMENTS

| | | |
|---|---|---|
| 2013/0012260 A1 | 1/2013 | Salkintzis et al. |
| 2013/0311640 A1* | 11/2013 | Gleixner ............ H04W 40/246 709/224 |

OTHER PUBLICATIONS

3GPP, "Key Issue WLAN Load Information," 3GPP SA WG2 Meeting #93, S2-123721, WLAN_NS / Rel-12, Intel, AT&T, Orange, Oct. 8-12, 2012, 2 pages, Sofia, Bulgaria.

3GPP, "Key Issue WLAN Selection Policies based on Access Network Type and Venue Information," 3GPP SA WG2 Meeting #93, S2-123722, WLAN_NS / Rel-12, Intel, AT&T, Orange, Alcatel Lucent , Oct. 8-12, 2012, 1 page, Sofia, Bulgaria.

International Search Report and Written Opinion dated Jan. 6, 2014 from International Application No. PCT/US2013/061489.

Wang et al., "Upstream Congestion Control in Wireless Sensor Networks Through Cross-Layer Optimization," IEEE Journal on Selected Areas in Communications, vol. 25, No. 4, May 2007, 10 pages.

Notification Concerning Transmittal of International Preliminary Report on Patentability dated Apr. 9, 2015 from International Application No. PCT/US2013/061489.

Office Action dated Jan. 11, 2016 from Korean Patent Application No. 2015-7005371.

Extended European Search Report dated May 4, 2016 from European Patent Application No. 13842096.3, 8 pages.

Zhou et al., "Deprioritization of Heavy Users in Wireless Networks," IEEE Communications Magazine, IEEE Service Center, vol. 49, No. 10, Oct. 1, 2011 (Oct. 1, 2011), Piscataway, US, 8 pages.

Extended European Search Report dated Oct. 11, 2017 from European Divisional Application No. 17177576.0, 9 pages.

3GPP, "Technical Specification Group Core Network and Terminals; Access Network Discovery and Selection Function (ANDSF) Management Object (MO) (Release 11)," 3GPP TS 24.312 V11.4.0 (Sep. 2012), Sep. 17, 2012, Lte Advanced, 168 pages.

* cited by examiner

ANDSF PARAMETERS FOR WLAN NETWORK SELECTION

CROSS REFERENCE TO RELATED APPLICATIONS

The present application is a continuation of U.S. application Ser. No. 13/830,456, filed Mar. 14, 2013, entitled "ANDSF PARAMETERS FOR WLAN NETWORK SELECTION," which claims priority to U.S. Provisional Patent Application No. 61/707,784, filed Sep. 28, 2012, entitled "Advanced Wireless Communication Systems and Techniques," the entire disclosure of which is hereby incorporated by reference in its entirety.

FIELD

Embodiments relate to apparatuses, methods and storage media for a third generation partnership project (3GPP) user equipment (UE) to leverage wireless local area network (WLAN) dynamic parameters when leaving a 3GPP network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Typically, cellular networks need to be able to handoff or offload user equipment (UEs) to wireless local area networks (WLANs). An example of a cellular network may include a 3G or 4G network such as those defined by third generation partnership project (3GPP) specifications. An example of a WLAN may include a Wi-Fi network such as those described by the Institute of Electrical and Electronics Engineers (IEEE) 802.11 specifications. In certain embodiments, the cellular network operator may set static policies for the UE to access the WLAN.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for allowing a UE to use an ANDSF quality of service (QoS) policy to determine a preferred WLAN for the UE to connect to from a cellular network. In some embodiments, the UE may receive one or more of air-interface congestion parameters, backhaul congestion parameters, and/or WLAN location parameters related to the WLAN. The UE may then compare the received parameters to one or more ANDSF QoS policies to determine whether the WLAN has sufficient bandwidth for the UE to connect to the WLAN and still maintain sufficient QoS.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
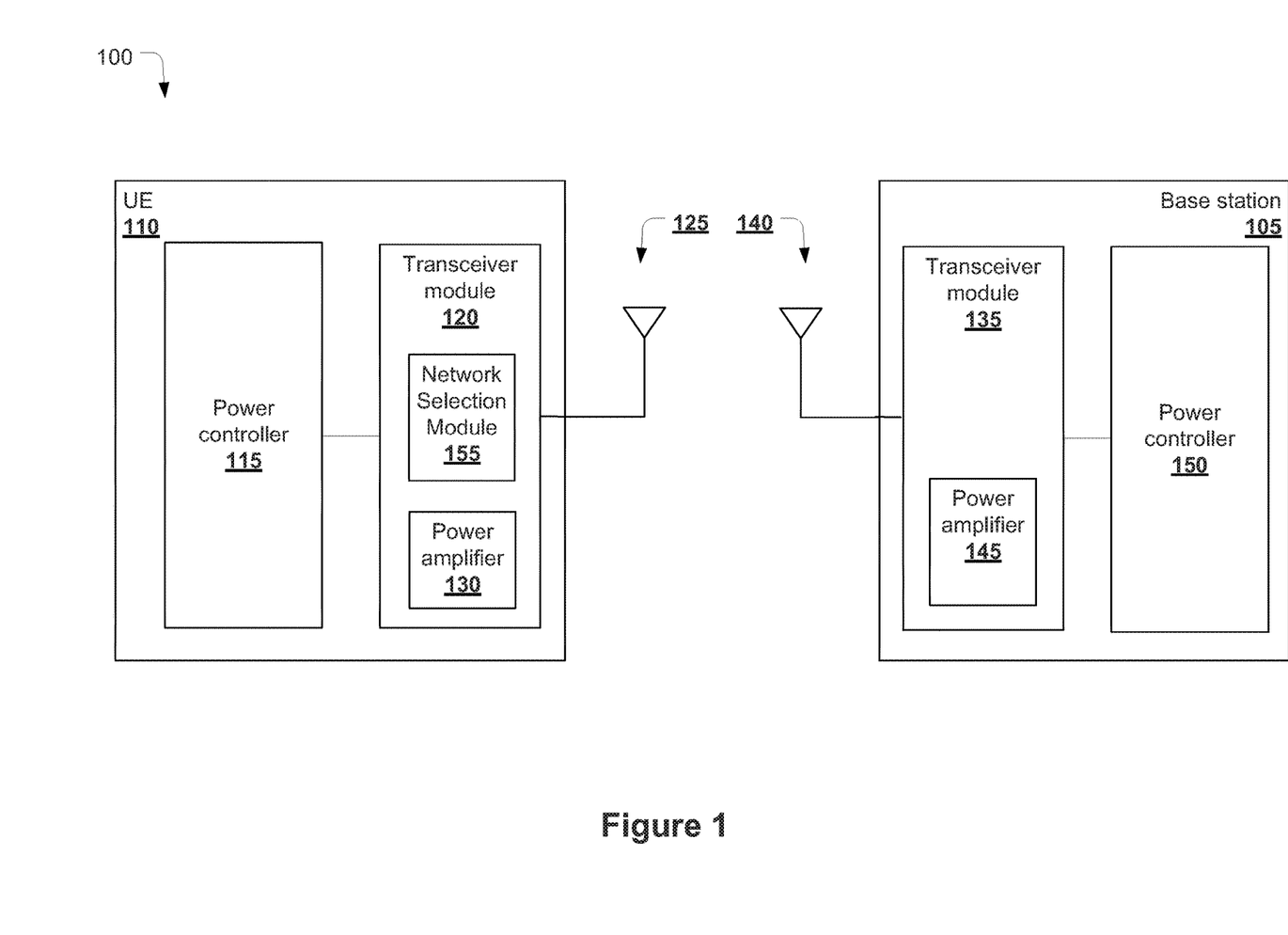
FIG. 1 schematically illustrates a high-level example of a network system comprising a UE and a base station, in accordance with various embodiments.

FIG. 1 schematically illustrates a wireless communication network 100 in accordance with various embodiments. Wireless communication network 100 (hereinafter "network 100") may be a cellular network, for example a 3GPP long term evolution (LTE) network such as an evolved universal terrestrial radio access network (E-UTRAN). In other embodiments, the network 100 may be a WLAN such as an IEEE 802.11 Wi-Fi network. The network 100 may include a base station 105, configured to wirelessly communicate with a UE 110. The base station 105 may be a 3GPP eNodeB (eNB) or a WLAN access point (AP). The UE 110 may be configured to communicate with one or more of a 3GPP eNB or a WLAN AP either one at a time or substantially in parallel with one another.

As shown in FIG. 1, the UE 110 may include a transceiver module 120. The transceiver module 120 may be further coupled with an antenna 125 of the UE 110 for communicating wirelessly with other components of the network 100, e.g., base station 105. The antenna 125 may be powered by a power amplifier 130, which may be a component of the transceiver module 120, as shown in FIG. 1, or may be a separate component of the UE 110. In one embodiment, the power amplifier 130 provides the power for all transmissions on the antenna 125. In other embodiments, there may be multiple power amplifiers, multiple antennas, or both, on the UE 110. In embodiments, the UE 110 may include a network selection module 155 which may include one or more processors or controllers. The network selection module 155 may be part of the transceiver module 120 as shown, while in other embodiments the network selection module 155 may be separate from the transceiver module 120. The network selection module 155 may be configured to determine whether a UE 110 should connect to an eNB or an AP of a network. If the UE 110 has the option of connecting to multiple networks simultaneously, the network selection module 155 may be configured to determine which of the networks the UE 110 should connect to. In embodiments, the network selection module 155 may be hardware, software, firmware, or some other type of logic configured to perform the processes described herein.

The base station 105 may include a transceiver module 135 coupled with an antenna 140 of the base station 105 for communicating wirelessly with a network component such as the UE 110. The base station 105 may further include a power amplifier 145 coupled with the transceiver module 135 and a power controller 150. In one embodiment, the power amplifier 145 provides the power for all transmissions on the antenna 140. In other embodiments, there may be multiple power amplifiers or multiple antennas, or both, on the base station 105.

Figure 2:
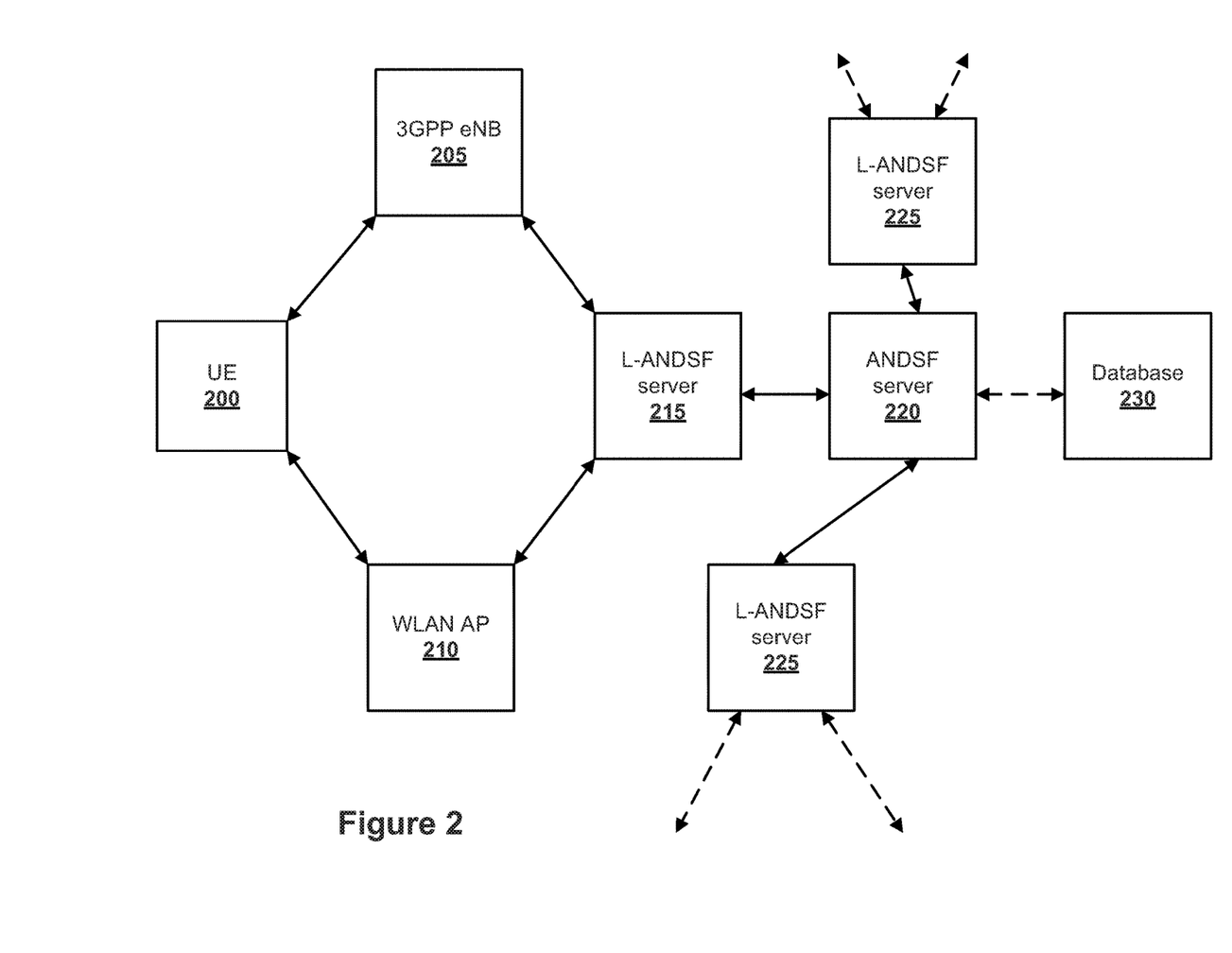
FIG. 2 illustrates an example of a multi-operator network including both cellular and WLAN entities, in accordance with various embodiments.

FIG. 2 depicts an example of a system including elements of both a cellular network and a WLAN. In embodiments, a UE 200, which may be similar to UE 110 described above, may be communicatively coupled with a 3GPP eNB 205 and a WLAN AP 210. In embodiments, the 3GPP eNB 205 may be the same as, or substantially similar to, the base station 105 described above. Similarly, the WLAN AP 210 may be the same as, or substantially similar to, the base station 105 described above.

In embodiments, one or both of the 3GPP eNB 205 and/or the WLAN AP 210 may be communicatively coupled with a local ANDSF (L-ANDSF) server 215. The L-ANDSF server 215 may be coupled with an ANDSF server 220. In embodiments, the ANDSF server 220 may be a server in the 3GPP network which may be controlled by the 3GPP network operator. The ANDSF server 220 may be communicatively coupled with one or more 3GPP eNBs 205 or WLAN APs 210, which in turn serve one or more UEs in the 3GPP network. In some embodiments, the L-ANDSF server 215 may be communicatively positioned between the ANDSF server 220 and the 3GPP eNB 205 or WLAN AP 210, as shown in FIG. 2. In these embodiments, the L-ANDSF server 215 may serve a subset of the 3GPP eNBs 205 and/or the WLAN APs 210 and, as a result, the L-ANDSF server 215 may only be communicatively coupled with a subset of UEs 200 in the network.

Using a hierarchy of ANDSF servers such as the ANDSF server 220 and a plurality of L-ANDSF servers 215 or 225 may provide advantages over using a single centralized ANDSF server 220. For example, a network operator such as the 3GPP network operator may allow the L-ANDSF server 215 to have control of ANDSF quality of service (QoS) policies for a subset of UEs, as explained later, instead of using a centralized ANDSF QoS policy controller. Controlling ANDSF QoS policies for a subset of UEs, rather than all UEs in a network, may allow the L-ANDSF server 215 to dynamically alter its ANDSF QoS policies to correspond to changing conditions, for example the arrival or departure of a large number of UEs simultaneously such as may occur at an airport.

Similarly, a 3GPP network operator may allow a different network operator, for example a roaming partner of the 3GPP network operator, to control the QoS policies for the L-ANDSF server 215 if L-ANDSF server 215 is part of the roaming network. In some embodiments, the centralized ANDSF server 220 may provide one or more policies for use by L-ANDSF servers 215 or 225. The ANDSF server 220 may also delegate some QoS policy authority to a Wireless Internet Service Provider (WISP) partner. This authority may include parameters defining the scope of the delegation, how to avoid ping pong affects, or protocols for fine tuning load balancing and network selection decisions. In some embodiments, the L-ANDSF servers 215 or 225 may be the same as the ANDSF server 220. In some embodiments, the L-ANDSF servers 215 and 225 and/or the ANDSF server 220 may be implemented as different software modules being run on the same hardware, while in other embodiments the L-ANDSF servers 215 and 225 and/or the ANDSF server 220 may be different hardware elements.

In some embodiments, the ANDSF server 220 may be communicatively coupled with one or more databases 230. In some embodiments, the database 230 may store statistics and policies related to the air-interface or backhaul congestion of one or more WLANs. In some embodiments, the database 230 may store ANDSF QoS policies. Additionally or alternatively, the database 230 may store data related to one or more cellular networks such as a 3G/4G network. In some embodiments, the data base 230 may be part of the ANDSF server 220, or an L-ANDSF server 215 or 225. In other embodiments, the database 230 may be communicatively coupled with the ANDSF server 220 and/or the L-ANDSF server 215 or 225, for example by direct connection, via a wireless link such as a WLAN or a 3G or 4G cellular network, through the Internet, or via some other manner of communicative coupling.

In some embodiments, the database 230 may use the data in the database 230 to create one or more ANDSF policies, for example policies based on data related to the cellular networks, air-interface load or congestion of the WLAN, backhaul congestion of the WLAN, or some other parameter. The database 230 may then transfer the QoS policy to the ANDSF server 220. In other embodiments, the database of 230 may transfer the data, for example the cellular network data, air-interface data, backhaul data, or some other data to the ANDSF server 220, or the L-ANDSF servers 215 or 225, which in turn may create new ANDSF QoS policies. If the ANDSF server 220 creates the ANDSF QoS policies, then the ANDSF server 220 may transmit one or more of the ANDSF QoS policies to the L-ANDSF servers 215 or 225, which may in turn transmit the policies to one or more of the UEs 200. In some embodiments, ANDSF QoS policies may be transmitted from the ANDSF server 220 or the L-ANDSF server 215 to the UE 200 via short message service (SMS), using an internet protocol (IP) level protocol such as simple object access protocol extensible markup language (SOAP-XML), or open mobile alliance device management (OMA-DM).

In embodiments, the ANDSF QoS policies may allow the UE 200, and specifically the network selection module 155 of the UE, to determine whether an AP, for example WLAN AP 210 may be an AP that the UE 200 should connect to. For example, in some embodiments the UE 200 may want to disconnect from the 3GPP eNB 205 for a variety of reasons such as convenience, congestion of the 3GPP network, direction from a user of the UE 200, or some other reason. In these embodiments, the UE 200 may use one or more ANDSF QoS policies to determine whether the WLAN AP 210 may be acceptable to connect to, or if there are plural WLAN APs, to which WLAN AP to connect.

In some embodiments, it may be advantageous for one or more of the ANDSF QoS policies to involve load or congestion parameters of the WLAN network, of which the WLAN AP 210 may be a part. Similarly, it may be advantageous for one or more of the ANDSF QoS policies to involve load or congestion parameters of the air-interface of the WLAN network. Finally, it may be advantageous for one or more of the ANDSF QoS policies to involve venue or location related information of the WLAN AP 210.

Figure 3:
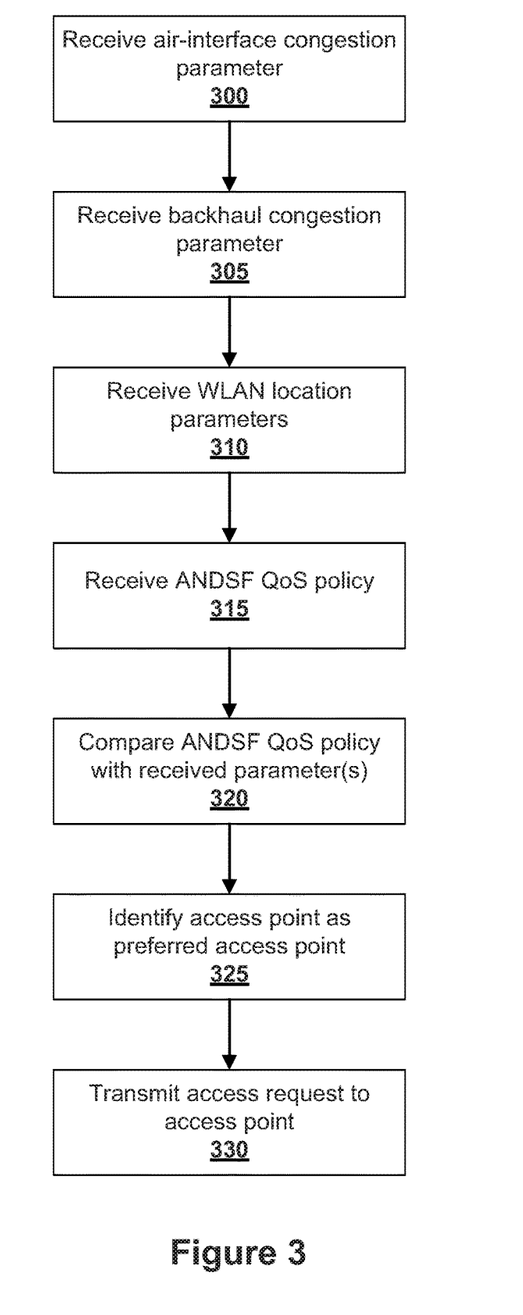
FIG. 3 illustrates an example of an access point identification procedure, in accordance with various embodiments.

FIG. 3 illustrates an example of a process that may be used by a UE such as UE 200, and more specifically the network selection module of the UE, to utilize one or more ANDSF QoS policies to determine whether it is acceptable for the UE to connect with a WLAN AP, such as WLAN AP 210. In embodiments, the UE 200 may receive an air-interface congestion parameter at 300. In some embodiments, the WLAN AP 210 may be compliant with the Wi-Fi Alliance (WFA) Hotspot 2.0 Technical Specification v1.0.0 (published Feb. 16, 2013). Compliance with the Hotspot 2.0 Technical Specification may allow the WLAN AP 210 to broadcast the basic service set (BSS) load element specified in, for example, the IEEE 802.11-2012 standards published in March 2012. In embodiments, the BSS load element may include one or more of the following.

Station Count (STA Count): The STA count field may be interpreted as an integer (which may be unsigned) indicating the total number of UEs currently associated with the WLAN network.

Channel Utilization: The channel utilization field may indicate the percentage of time that the WLAN AP sensed that the air interface was busy. This sensing may be based on a physical or virtual carrier sense mechanism.

Available Admission Capacity: The available admission capacity field may indicate the remaining amount of time available via explicit admission control. The field may be helpful for roaming UEs to select a WLAN AP that may be likely to accept future admission control requests.

In embodiments, the UE 200 may also receive one or more backhaul congestion parameters at 305. The backhaul congestion parameters may indicate information regarding congestion of the backhaul link connecting the WLAN AP 210 to the Internet. In some embodiments, the congestion parameters may be elements of the Access Network Query Protocol (ANQP) Wireless Area Network (WAN) Metrics Element as described, for example, in the WFA Wi-Fi CERTIFIED Passpoint™ (Release 1) Deployment Guidelines, published in October 2012. In some embodiments, the UE 200 may query the WLAN AP 210 using the ANQP WAN Metrics Element to retrieve information regarding the backhaul link that may be connecting the WLAN AP 210 to the Internet. In some embodiments, the ANQP WAN Metrics Element may describe several properties of the backhaul link including one or more of the following.

Downlink speed: The downlink speed may describe the downlink speed of the WAN backhaul link in kilobits per second, though other measures may be used.

Uplink speed: The uplink speed may describe the uplink speed of the WAN backhaul link in kilobits per second, though other measures may be used.

Downlink load: The downlink load may describe the percentage of loading of the downlink backhaul connection measured over a certain time period.

Uplink load: The uplink load may describe the percentage loading of the uplink backhaul connection measured over a certain time interval.

In embodiments, the UE 200 may also receive one or more WLAN location parameters at 310. For example, the UE 200 may receive an Access Network Type Field as defined in the IEEE 802.11-2012 specifications and the WFA Hotspot 2.0 specification. The Access Network Type Field may be used to indicate information such as whether the WLAN may be a chargeable public network, a free public network, a private network, a private network with guest access, or some other type of network. In embodiments, the Access Network Type Field may be used by the UE 200 to identify the WLAN as a private, public, free personal, emergency, or some other type of network. In some embodiments, the WLAN location parameters may also include the Venue Info Field ANQP Element and/or the Operator's Friendly Name Hotspot 2.0 ANQP Element as defined by the WFA Hotspot 2.0 specification. These elements may be broadcast by the WLAN AP 210, or they may be supplied by the WLAN AP 210 in response to a query by the UE 200.

In embodiments, the Venue Info Field ANQP Element may help the UE 200 identify whether the WLAN network venue may be a residential, public, or business venue. The Venue Info Field ANQP Element may further identify where the WLAN may be deployed, for example a school, hospital, hotel, professional office, etc. This venue information may allow 3GPP network operators to apply different ANDSF QoS policies for different types of WLAN networks such as public, home, or enterprise based WLAN networks. In embodiments, the Operator's Friendly Name Hotspot 2.0 ANQP Element may be used to identify a specific name of the WLAN AP 210, and be used to identify, for example, a WLAN AP 210 belonging to a specific company.

In some embodiments, the venue information may also specify validity conditions/criteria in ANDSF and may be used by 3GPP operators to specify specific policies in different locations. As an example, a 3GPP operator may want to have ANDSF QoS policies whereby traffic can be offloaded to its roaming partners but only in a certain time window and at a particular geographic location, for example during rush hour in a busy downtown area. In this example, 3GPP operator A may have a relationship with WLAN operator #1 with a WLAN AP with SSID1 and WLAN operator #2 with a WLAN AP with SSID2. The ANDSF QoS policy may specify that if a UE, for example UE 200, is in location x and between time y and z, then the UE should prefer the WLAN AP with SSID1, but for other locations or times the UE should prefer the WLAN AP with SSID2. However, the PLMN priority list in the UE may have SSID2 higher in preference than SSID1. Using the above described ANDSF QoS policy, if the user is at location x between time y and z, the UE may select the WLAN AP with SSID1 that ANDSF has prioritized, rather than the WLAN AP with SSID2 as dictated by the PLMN priority list.

The UE 200 may then receive an ANDSF QoS policy at 315 from the ANDSF server 220, the L-ANDSF server 215, or some other ANDSF server. In embodiments, the UE 200 may have received the ANDSF QoS policy prior to receiving one or more of the air-interface congestion parameter, the backhaul congestion parameter, or the WLAN location parameter described above. In other words, the UE 200 may have already been provisioned with the ANDSF QoS policy prior to receiving any information or parameters of the WLAN. In other embodiments, the UE 200 may receive one or more of the above WLAN parameters and then request the ANDSF QoS policy from a policy server. The ANDSF QoS policy may establish criteria used by the UE 200 to evaluate dynamic WLAN APs and networks, and thereby the ANDSF QoS policy may establish a basis for WLAN selection.

In embodiments, the ANDSF QoS policy may be an inter-system mobility policy (ISMP) which may provide network selection rules for a UE 200 with only a single active access network connection. For example, an ISMP policy may be appropriate for a UE 200 which may only be connected to one of the 3GPP eNB 205 or the WLAN AP 210. In other embodiments, the ANDSF QoS policy may be an inter-system routing policy (ISRP) which may provide network selection rules for a UE 200 with more than one active access network connection. For example, the ISRP policy may be appropriate for a UE 200 which may be coupled with both the 3GPP eNB 205 and the WLAN AP 210. In other embodiments, the ANDSF QoS policy may be some other form of access network discovery policy. In some embodiments, one or more of the ISRP, ISMP, or access network discovery policies may be similar to 3GPP ISRP, ISMP, or access network discovery policies such as those described in the 3GPP Technical Specification 24.312 V11.5.0, published in December 2012.

The UE 200 may then compare the received ANDSF QoS policy with one or more of the received air-interface congestion, backhaul congestion, or WLAN location parameters at 320. The comparison of the ANDSF QoS policy with the one or more received parameters may dictate whether the UE 200 connects to the WLAN AP 210. In some embodiments, the ANDSF QoS policy may only contain a single parameter, while in some embodiments the ANDSF QoS policy may contain a plurality of the parameters. In some embodiments, the one or more parameters may be considered over a certain time period.

Based at least in part upon the comparison of the ANDSF QoS policy with one or more of the received air-interface congestion, backhaul congestion, or WLAN location parameters at 320, the UE may identify the WLAN AP 210 as a preferred WLAN AP 210 at 325. Based at least in part on the identification of the WLAN AP 210 as a preferred WLAN AP 210, the UE may then transmit an access request to the WLAN AP 210 at 330.

In some embodiments, the WLAN AP 210 may be identified at 325 as a preferred WLAN AP 210 for a specific type of traffic of the UE 200, for example data traffic. In other embodiments, the WLAN AP 210 may be identified at 325 as a preferred WLAN AP 210 for all traffic of the UE 200. In some embodiments, there may be more than one preferred WLAN AP based upon the ANDSF QoS policy, in which case the UE 200 may connect with a WLAN AP 200 based on random selection, or some additional ANDSF policy or metric. In some embodiments, the UE 200 may already be connected to the WLAN AP 210 and be changing the nature of the connection at 330, for example by using the WLAN AP 210 for additional traffic flow, while in other embodiments the UE 200 may be initially connecting with the WLAN AP 210 at 330, for example after waking up from a sleep mode or as part of a handover procedure from a 3GPP eNB 205.

As one example, an ANDSF QoS policy may direct the UE 200 to prefer WLAN network(s) from amongst the available WLAN networks that have a total number of UEs associated with the WLAN AP that may be less than a defined threshold (which may be an absolute or relative value). In some embodiments, the number may be considered over a time duration, for example as a summation, an average, or some other statistic. As another example, an ANDSF QoS policy may direct the UE 200 to prefer a certain WLAN over the current cellular network of the UE 200 if the WLAN was busy for less than a specified threshold (which may be an absolute or relative value) and/or if the uplink or downlink connection of the WLAN was busy for less than a specified threshold (which may also be an absolute or relative value). As a third example, the ANDSF QoS policy may direct the UE to move at least part of its traffic, for example its data traffic, from the UE's current cellular network to a WLAN network if the WLAN network has a remaining amount of medium time available via admission control greater than a specified threshold (which may be an absolute or relative value) for a given time duration. As another example, an ANDSF QoS policy may utilize the WLAN location parameters received at 310 to determine a preferred WLAN AP 210. For example, in some locations an SSID may be used as a standard way of indicating public WLAN APs 210 which charge the user to connect to the WLAN AP 210, and WLAN APs 210 which may be free to use. Therefore, the ANDSF QoS policy may be used by a network operator to direct a UE 200 to use a free-of-charge WLAN AP 210. These are merely examples of ANDSF QoS policies, and other ANDSF QoS policies may be additionally or alternatively used that may utilize one or more of the air-interface congestion, backhaul congestion, or WLAN location parameters as described above.

In some embodiments, an ANDSF QoS policy may be defined using one or more of the following parameters.

NumberSTAs: The NumberSTAs parameter may be used in the ANDSF QoS policy to identify a threshold or value of the total number of UEs connected with a WLAN AP or a network of WLAN APs.

MediumAvailTime: The MediumAvailTime parameter may be used in the ANDSF QoS policy to set a threshold or value related to the remaining amount of medium time, or air-interface capacity, available via explicit admission control for one or more WLAN APs.

PercentageTimeAPBusy/Throughput: As described above, the UE 200 may receive one or more air congestion parameters at 300, for example the BSS Load element. The PercentageTimeAPBusy/Throughput element may be used in an ANDSF QoS policy to specify a threshold or value related to an overall value for the air congestion parameters.

Latency: The Latency element may be used in an ANDSF QoS policy to specify a threshold or value related to latency (time delay) in the WLAN. For example, the UE 200 may connect to the WLAN AP 210 for certain applications such as games or streaming video that are latency-sensitive if the latency of the WLAN AP 210 is below a certain threshold.

Responsiveness/time to first byte (TTFB): The responsiveness/TTFB element may be used in an ANDSF QoS policy to specify a threshold or value related to the responsiveness of the WLAN. For example, the TTFB may be used to set a threshold related to how quickly a web server in the WLAN may respond to a user request. In some embodiments, TTFB may be considered the duration of time between a virtual user making a data request and receiving the first piece of data in response.

Backhaul Bandwidth: The backhaul bandwidth may be used in an ANDSF QoS policy to specify a threshold or value related to usage of the WLAN. For example, the backhaul bandwidth may include one or more of downlink or uplink load over a certain period of time, or downlink or uplink speed, which in some embodiments may be measured in terms of kilobits per second or some other metric as described above with respect to the ANQP WAN Metrics Element.

QoS Map: The QoS Map element may similar to the QoS Map element defined in the IEEE 802.11-2012 Wi-Fi standards published in March, 2012. Specifically, the QoS Map element may be used to specify how 3GPP QoS flags may be mapped to Wi-Fi QoS flags.

Venue Information: The venue information may be used by ANDSF QoS policies to identify a venue group type such as whether the WLAN may be residential, business, enterprise etc. Additionally or alternatively, the venue information may be used to specify a venue type such as whether the venue may be a coffee shop, as school, a museum, a hospital, an airport, etc. Additionally or alternatively, the venue information may be used to specify a specific venue name such as "San Jose Airport," or an access network type such as whether the access network may be public, private, home, visited, etc.

In some embodiments, one or more of these parameters may be added to the ANDSF management object such as that described in the 3GPP Technical Specification 24.312 V11.5.0, published in December 2012. In embodiments, an ANDSF QoS policy may include one or more of the above described ANDSF QoS policy parameters. For example one or more of the following ANDSF QoS policies may be used by a network operator to specify the behavior of the UE 200:

BSSLoad: The ANDSF QoS BSSLoad policy may specify the acceptable BSS Load in the WLAN for the UE 200 to consider the WLAN AP 210 for selection. The BSSLoad policy may include one or more of the NumberSTAs, MediumAvailTime, and/or PercentageTimeAPBusy/Throughput parameters, or some other parameter. As an example, one or more of the Number STAs, MediumAvailTime, and/or PercentageTimeAPBusy/Throughput parameters may be used to specify respective thresholds for each of those parameters.

Latency: The ANDSF QoS Latency policy may be used to specify the acceptable amount of latency in the WLAN for the UE 200 to consider connecting to the WLAN AP 210. In embodiments, the ANDSF QoS Latency policy may include the Latency parameter. As an example, the Latency parameter may be used to define a threshold for maximum allowed latency in the WLAN.

TTFB: The ANDSF QoS TTFB policy may be used to specify an acceptable TTFB level in the WLAN for the UE 200 to consider connecting to the WLAN AP 210. In embodiments, the ANDSF QoS TTFB policy may include the Responsiveness/TTFB parameter. As an example, the TTFB parameter may be used to define a threshold for maximum allowed responsiveness/TTFB in the WLAN.

DL Bandwidth: The ANDSF QoS DL Bandwidth policy may be used to specify the minimum acceptable DL Bandwidth in the WLAN for the UE 200 to consider connecting to the WLAN AP 210. In embodiments, the DL Bandwidth policy may include one or more of downlink speed, backhaul load, and/or number of UEs associated with the WLAN AP 210. In embodiments, the parameters of the ANDSF QoS DL Bandwidth policy may include one or more of the NumberSTAs and backhaul bandwidth ANDSF QoS policy parameters discussed above.

UL Bandwidth: The ANDSF QoS UL Bandwidth policy may be used to specify the minimum acceptable UL Bandwidth in the WLAN for the UE 200 to consider connecting to the WLAN AP 210. In embodiments, the UL Bandwidth policy may include one or more of uplink speed, backhaul load, and/or number of UEs associated with the WLAN AP 210. In embodiments, the parameters of the ANDSF QoS UL Bandwidth policy may include one or more of the NumberSTAs and backhaul bandwidth ANDSF QoS policy parameters discussed above.

RoutingCriteria: The ANDSF QOS RoutingCriteria policy may be used in conjunction with one or more other ANDSF QoS policies to specify that the other ANDSF QoS policy specifies to a home or roaming network.

As noted above, these are merely examples of ANDSF QoS policies. In other embodiments, other ANDSF QoS policies may combine one or more of the above examples, or add additional elements.

Because the ANDSF QoS policies my be based on dynamic elements such as air-interface congestion or backhaul congestion, in some embodiments it may be desirable for the ANDSF QoS policies to be updated based on current WLAN conditions. For example in certain conditions, an ANDSF server 220 or an L-ANDSF server 215 may monitor current network conditions and then transmit an updated ANDSF QoS policy to a UE 200. For example an ANDSF QoS policy related to load of a WLAN may need to be adjusted if all of the 3GPP and/or WLAN networks become very busy, such as in the case of a sudden influx of UEs at an airport.

Figure 4:
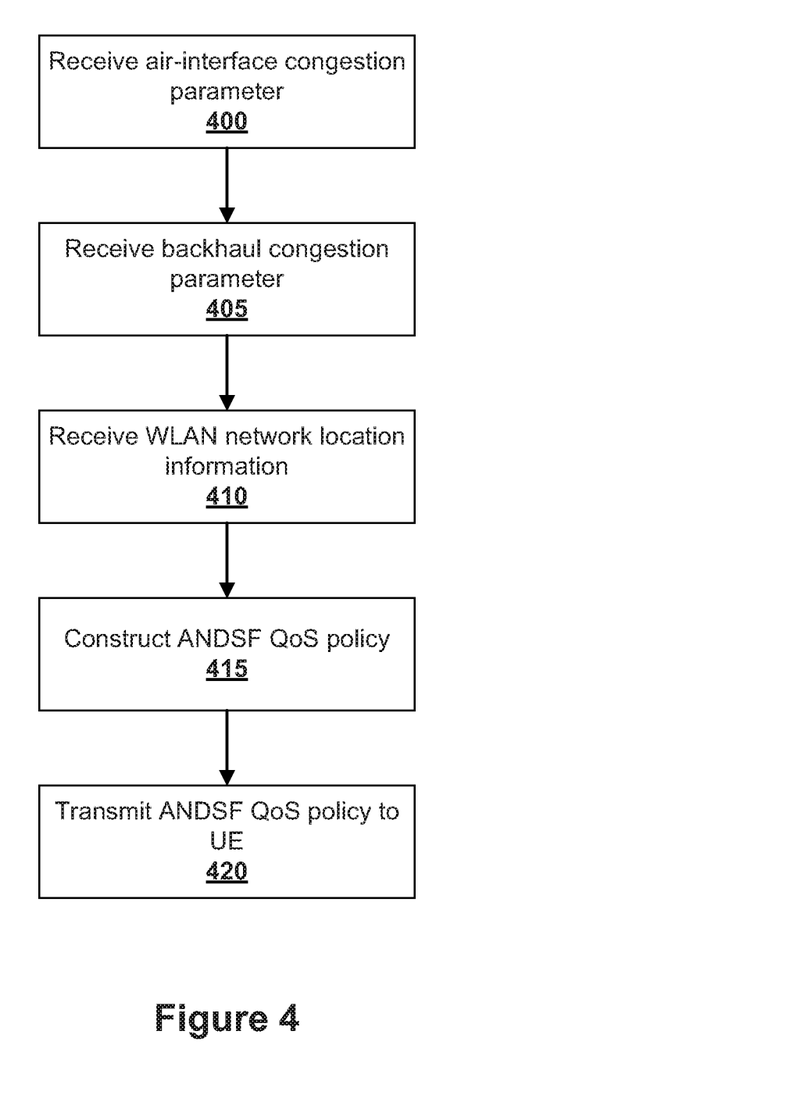
FIG. 4 illustrates an example of an access network discovery and selection function (ANDSF) policy update procedure, in accordance with various embodiments.

FIG. 4 depicts an example of a process that may be used, for example by an ANDSF server 220 or an L-ANDSF server 215 to monitor network conditions and transmit an updated ANDSF QoS policy. Initially, one or more air-interface congestion parameters, such as the air-interface congestion parameters described above with respect to 300, may be received by the ANDSF server 220 or the L-ANDSF server 215 at 400. Similarly, one or more backhaul congestion parameters such as the backhaul congestion parameters described above with respect to 305, may be received by the ANDSF server 220 or the L-ANDSF server 215 at 405. Similarly, the ANDSF server 220 or the L-ANDSF server 215 may receive WLAN network location information at 410. In some embodiments, less than all of the air-interface congestion parameter, backhaul congestion parameter, and/or the WLAN network location information may be received, while in other embodiments the ANDSF server 220 or the L-ANDSF server 215 may receive all three of the above described parameters.

After receiving the parameters at 400, 405, and/or 410, the ANDSF server 220 and/or the L-ANDSF server 215 may construct an ANDSF QoS policy at 415 such as the ANDSF QoS policies described above. Alternatively, an ANDSF QoS policy may be specified by an operator and delivered to one of the L-ANDSF server 215 or the ANDSF server 220. In some embodiments, constructing the QoS policy at 415 may comprise altering an existing ANDSF QoS policy, for example an ANDSF QoS policy related to the number of UEs connected to the WLAN AP 210. In other embodiments, the ANDSF QoS policy may be constructed as a new ANDSF QoS policy. In some embodiments, data or statistics may be retrieved from the database of statistics and policies 230, web accessed database of statistics and management 235, and/or the database of the dynamic load of the 3G/4G network 240 and taken into account during construction of the ANDSF QoS policy.

After constructing the ANDSF QoS policy at 415, the ANDSF QoS policy may be transmitted to the UE 200 at 420. In some embodiments, the transmission at 420 may be the result of a request from the UE 200. In other embodiments, the transmission at 420 may be the result of a "push" action wherein the policy may be pushed to the UE 200. In embodiments, the ANDSF QoS policy may be transmitted to the UE 200 via a transmission protocol such as SMS, SOAP-XML, OMA-DM, or some other transmission protocol.

Figure 5:
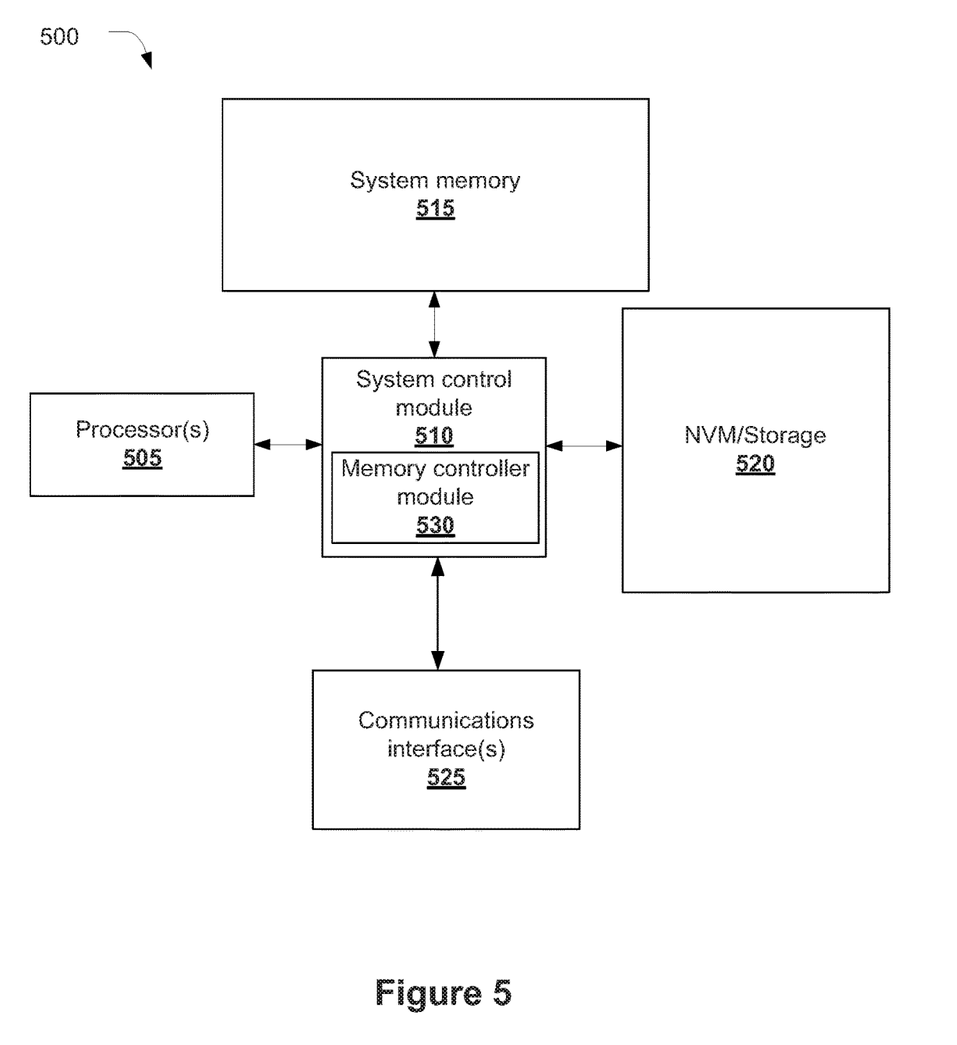
FIG. 5 schematically illustrates an example system that may be used to practice various embodiments described herein.

Embodiments of the present disclosure may be implemented into a system using any suitable hardware and/or software to configure as desired. FIG. 5 schematically illustrates an example system 500 that may be used to practice various embodiments described herein. FIG. 5 illustrates, for one embodiment, an example system 500 having one or more processor(s) 505, system control module 510 coupled to at least one of the processor(s) 505, system memory 515 coupled to system control module 510, non-volatile memory (NVM)/storage 520 coupled to system control module 510, and one or more communications interface(s) 525 coupled to system control module 510.

In some embodiments, the system 500 may be capable of functioning as the UE 110 as described herein. In other embodiments, the system 500 may be capable of functioning as the base station 105 depicted in the embodiment shown in FIG. 1 or any one of the other described embodiments. In other embodiments, the system 500 may be capable of functioning as the ANDSF server 220 or the L-ANDSF server 215. In some embodiments, the system 500 may include one or more computer-readable media (e.g., system memory or NVM/storage 520) having instructions and one or more processors (e.g., processor(s) 505) coupled with the one or more computer-readable media and configured to execute the instructions to implement a module to perform actions described herein.

System control module 510 for one embodiment may include any suitable interface controllers to provide for any suitable interface to at least one of the processor(s) 505 and/or to any suitable device or component in communication with system control module 510.

System control module 510 may include memory controller module 530 to provide an interface to system memory 515. The memory controller module 530 may be a hardware module, a software module, and/or a firmware module.

System memory 515 may be used to load and store data and/or instructions, for example, for system 500. System memory 515 for one embodiment may include any suitable volatile memory, such as suitable DRAM, for example. In some embodiments, the system memory 515 may include double data rate type four synchronous dynamic random-access memory (DDR4 SDRAM).

System control module 510 for one embodiment may include one or more input/output (I/O) controller(s) to provide an interface to NVM/storage 520 and communications interface(s) 525.

The NVM/storage 520 may be used to store data and/or instructions, for example. NVM/storage 520 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 520 may include a storage resource physically part of a device on which the system 500 may be installed or it may be accessible by, but not necessarily a part of, the device. For example, the NVM/storage 520 may be accessed over a network via the communications interface(s) 525.

Communications interface(s) 525 may provide an interface for system 500 to communicate over one or more network(s) and/or with any other suitable device. The system 500 may wirelessly communicate with the one or more components of the wireless network in accordance with any of one or more wireless network standards and/or protocols.

For one embodiment, at least one of the processor(s) 505 may be packaged together with logic for one or more controller(s) of system control module 510, e.g., memory controller module 530. For one embodiment, at least one of the processor(s) 505 may be packaged together with logic for one or more controllers of system control module 510 to form a System in Package (SiP). For one embodiment, at least one of the processor(s) 505 may be integrated on the same die with logic for one or more controller(s) of system control module 510. For one embodiment, at least one of the processor(s) 505 may be integrated on the same die with logic for one or more controller(s) of system control module 510 to form a System on Chip (SoC).

In various embodiments, the system 500 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 500 may have more or less components, and/or different architectures. For example, in some embodiments, the system 500 includes one or more of a camera, a keyboard, liquid crystal display (LCD) screen (including touch screen displays), non-volatile memory port, multiple antennas, graphics chip, application-specific integrated circuit (ASIC), and speakers.

The various embodiments of the present disclosure have been described including, but are not limited to:

Example 1 may be a user equipment (UE) to identify access point parameters, the UE including a receiver to receive an air-interface congestion parameter of an access point in a wireless local area network (WLAN); and receive a backhaul congestion parameter of the access point. The UE may further include a network selection module coupled with the receiver to identify, based at least in part on a comparison of the air-interface congestion parameter or the backhaul congestion parameter to an access network discovery and selection function (ANDSF) quality of service (QoS) policy, that the access point is a preferred access point; and a transmitter coupled with the network selection module to transmit, based at least in part on an identification of the access point as a preferred access point, an access request to the access point.

Example 2 may include the subject matter of example 1 and further specify that the receiver is further to receive the ANDSF QoS policy from an ANDSF server.

Example 3 may include the subject matter of example 2, and further specify that the ANDSF server is a local ANDSF server (L-ANDSF) communicatively coupled with a subset of UE in a network including a plurality of UE.

Example 4 may include the subject matter of any of examples 1-3, and further specify that the air-interface congestion parameter is a basic service set (BSS) load parameter including station count, channel utilization, or available admission capacity.

Example 5 may include the subject matter of any of examples 1-3, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 6 may include the subject matter of any of examples 1-3, and further specify that the ANDSF QoS policy includes a basic service set (BSS) load policy, a latency policy, a time to first byte (TTFB) policy, a downlink bandwidth policy, an uplink bandwidth policy, or a location policy.

Example 7 may include the subject matter of any of examples 1-3, and further specify that the network selection module is further to identify that the access point is a preferred access point based at least in part on a name or location of the access point.

Example 8 may include the subject matter of any of examples 1-3, and further include a power supply coupled with the UE.

Example 9 may include one or more computer readable media including instructions to identify access point parameters, the instructions to, upon execution of the instructions by a user equipment (UE), cause the UE to receive an air-interface congestion parameter of an access point in a wireless local area network (WLAN) or a backhaul congestion parameter of the access point; receive an access network discovery and selection function (ANDSF) quality of service (QoS) policy; compare the air-interface congestion parameter or the backhaul congestion parameter to the ANDSF QoS policy; and transmit, based at least in part on comparison of the air-interface congestion parameters or the backhaul congestion parameters to the ANDSF QoS policy, an access request to the access point.

Example 10 may include the subject matter of example 9, and further specify that the instructions, upon execution of the instructions by a UE, further cause the UE to receive the ANDSF QoS policy from an ANDSF server.

Example 11 may include the subject matter of example 10, and further specify that the UE is a UE in a network including a plurality of UE, and wherein the ANDSF server is a local ANDSF server (L-ANDSF) communicatively coupled with a subset of UE in the network.

Example 12 may include the subject matter of any of examples 9-11, and further specify that the air-interface congestion parameter is a basic service set (BSS) load parameter including station count, channel utilization, or available admission capacity.

Example 13 may include the subject matter of any of examples 9-11, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 14 may include the subject matter of any of examples 9-11, and further specify that the ANDSF QoS policy includes a basic service set (BSS) load policy, a latency policy, a time to first byte (TTFB) policy, a downlink bandwidth policy, an uplink bandwidth policy, or a location policy.

Example 15 may include the subject matter of any of examples 9-11, and further specify that the instructions, upon execution of the instructions by the UE, further cause the UE to identify that the access point is a preferred access point based at least in part on a name or location of the access point.

Example 16 may be a method to identify access point parameters including receiving, at a user equipment (UE), an air-interface congestion parameter of an access point in a wireless local area network (WLAN) or a backhaul congestion parameter of the access point; receiving, at the UE, an access network discovery and selection function (ANDSF) quality of service (QoS) policy; comparing, at the UE, the air-interface congestion parameter or the backhaul congestion parameter to the ANDSF QoS policy; and transmitting, at the UE, based at least in part on comparison of the air-interface congestion parameters or the backhaul congestion parameters to the ANDSF QoS policy, an access request to the access point.

Example 17 may include the subject matter of example 16 and further include receiving, at the UE, the ANDSF QoS policy from an ANDSF server.

Example 18 may include the subject matter of example 17 and further specify that the UE is a UE in a network including a plurality of UE, and wherein the ANDSF server is a local ANDSF server (L-ANDSF) communicatively coupled with a subset of UE in the network.

Example 19 may include the subject matter of any of examples 16-18, and further specify that the air-interface congestion parameter is a basic service set (BSS) load parameter including station count, channel utilization, or available admission capacity.

Example 20 may include the subject matter of any of examples 16-18, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 21 may include the subject matter of any of examples 16-18, and further specify that the ANDSF QoS policy includes a basic service set (BSS) load policy, a latency policy, a time to first byte (TTFB) policy, a downlink bandwidth policy, an uplink bandwidth policy, or a location policy.

Example 22 may include the subject matter of any of examples 16-18, and further include identifying, at the UE, that the access point is a preferred access point based at least in part on a name or location of the access point.

Example 23 may be user equipment (UE) including means to receive an air-interface congestion parameter of an access point in a wireless local area network (WLAN) or a backhaul congestion parameter of the access point; means to receive an access network discovery and selection function (ANDSF) quality of service (QoS) policy; means to compare the air-interface congestion parameter or the backhaul congestion parameter to the ANDSF QoS policy; and means to transmit, based at least in part on comparison of the air-interface congestion parameters or the backhaul congestion parameters to the ANDSF QoS policy, an access request to the access point.

Example 24 may include the subject matter of example 23, and further include means to receive the ANDSF QoS policy from an ANDSF server.

Example 25 may include the subject matter of claim 24, and further specify that the UE is a UE in a network including a plurality of UE, and wherein the ANDSF server is a local ANDSF server (L-ANDSF) communicatively coupled with a subset of UE in the network.

Example 26 may include the subject matter of any of examples 23-25, and further specify that the air-interface congestion parameter is a basic service set (BSS) load parameter including station count, channel utilization, or available admission capacity.

Example 27 may include the subject matter of any of examples 23-25, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 28 may include the subject matter of any of examples 23-25, and further specify that the ANDSF QoS policy includes a basic service set (BSS) load policy, a latency policy, a time to first byte (TTFB) policy, a downlink bandwidth policy, an uplink bandwidth policy, or a location policy.

Example 29 may include the subject matter of any of examples 23-25, and further include means to identify that the access point is a preferred access point based at least in part on a name or location of the access point.

Example 30 may be an access network discovery and selection function (ANDSF) server to transmit an ANDSF quality of service (QoS) policy, the ANDSF server including: a receiver to receive an air-interface congestion parameter of an access point in a wireless local area network (WLAN) and a backhaul congestion parameter of the access point; an ANDSF policy module to determine, based at least in part on the air-interface congestion parameter or the backhaul congestion parameter, an ANDSF QoS policy to identify an access point as a preferred access point; and a transmitter to transmit the ANDSF QoS policy to a user equipment (UE).

Example 31 may include the subject matter of example 30, and further specify that the ANDSF server is a local ANDSF (L-ANDSF) server in a network including a plurality of UE, the L-ANDSF server communicatively coupled with less than all of the plurality of UE.

Example 32 may include the subject matter of examples 30 or 31, and further specify that the air-interface congestion parameter is a basic service set (BSS) load parameter including station count, channel utilization, or available admission capacity.

Example 33 may include the subject matter of examples 30 or 31, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 34 may include the subject matter of examples 30 or 31, and further specify that the ANDSF QoS policy is a basic service set (BSS) load policy, a latency policy, a time to first byte (TTFB) policy, a downlink bandwidth policy, an uplink bandwidth policy, or a location policy.

Example 35 may include the subject matter of examples 30 or 31, and further specify that the transmitter is further to transmit the ANDSF QoS policy to the UE via short message service (SMS), an internet protocol (IP) level protocol, or open mobile alliance device management (OMA-DM).

Example 36 may include the subject matter of examples 30 or 31, and further specify that the ANDSF server is a server of a visited network which is different from a home network of the UE.

Example 37 may be a method of transmitting an access network discovery and selection function (ANDSF) quality of service (QoS) policy, the method including receiving, at an ANDSF server, an air-interface congestion parameter of an access point in a wireless local area network (WLAN) and a backhaul congestion parameter of the access point; determining, at the ANDSF server, based at least in part on the air-interface congestion parameter or the backhaul congestion parameter, an ANDSF QoS policy to identify an access point as a preferred access point; and transmitting, at the ANDSF server, the ANDSF QoS policy to a user equipment (UE).

Example 38 may include the subject matter of example 37, and further specify that the ANDSF server is a local ANDSF (L-ANDSF) server in a network including a plurality of UE, the L-ANDSF server communicatively coupled with less than all of the plurality of UE.

Example 39 may include the subject matter of examples 37 or 38, and further specify that the air-interface congestion parameter is a basic service set (BSS) load parameter including station count, channel utilization, or available admission capacity.

Example 40 may include the subject matter of examples 37 or 38, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 41 may include the subject matter of examples 37 or 38, and further specify that the ANDSF QoS policy is a basic service set (BSS) load policy, a latency policy, a time to first byte (TTFB) policy, a downlink bandwidth policy, an uplink bandwidth policy, or a location policy.

Example 42 may include the subject matter of examples 37 or 38, and further include transmitting, at the ANDSF server, the ANDSF QoS policy to the UE via short message service (SMS), an internet protocol (IP) level protocol, or open mobile alliance device management (OMA-DM).

Example 43 may include the subject matter of examples 37 or 38, and further specify that the ANDSF server is a server of a visited network which is different from a home network of the UE.

Example 44 may be one or more computer readable media including instructions to transmit an access network discovery and selection function (ANDSF) quality of service (QoS) policy, the instructions to, upon execution of the instructions by an ANDSF server, cause the ANDSF server to receive an air-interface congestion parameter of an access point in a wireless local area network (WLAN) and a backhaul congestion parameter of the access point; determine, based at least in part on the air-interface congestion parameter or the backhaul congestion parameter, an ANDSF QoS policy to identify an access point as a preferred access point; and transmit the ANDSF QoS policy to a user equipment (UE).

Example 45 may include the subject matter of example 44, and further specify that the ANDSF server is a local ANDSF (L-ANDSF) server in a network including a plurality of UE, the L-ANDSF server communicatively coupled with less than all of the plurality of UE.

Example 46 may include the subject matter of examples 44 or 45, and further specify that the air-interface congestion parameter is a basic service set (BSS) load parameter including station count, channel utilization, or available admission capacity.

Example 47 may include the subject matter of examples 44 or 45, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 48 may include the subject matter of examples 44 or 45, and further specify that the ANDSF QoS policy is a basic service set (BSS) load policy, a latency policy, a time to first byte (TTFB) policy, a downlink bandwidth policy, an uplink bandwidth policy, or a location policy.

Example 49 may include the subject matter of examples 44 or 45, and further specify that the instructions are further to, upon execution of the instructions by the ANDSF server, cause the ANDSF server to transmit the ANDSF QoS policy to the UE via short message service (SMS), an internet protocol (IP) level protocol, or open mobile alliance device management (OMA-DM).

Example 50 may include the subject matter of examples 44 or 45, and further specify that the ANDSF server is a server of a visited network which is different from a home network of the UE.

Example 51 may be an access network discovery and selection function (ANDSF) server to transmit an ANDSF quality of service (QoS) policy, the ANDSF server including means to receive an air-interface congestion parameter of an access point in a wireless local area network (WLAN) and a backhaul congestion parameter of the access point; means to determine, based at least in part on the air-interface congestion parameter or the backhaul congestion parameter, an ANDSF QoS policy to identify an access point as a preferred access point; and means to transmit the ANDSF QoS policy to a user equipment (UE).

Example 52 may include the subject matter of example 51, and further specify that the ANDSF server is a local ANDSF (L-ANDSF) server in a network including a plurality of UE, the L-ANDSF server communicatively coupled with less than all of the plurality of UE.

Example 53 may include the subject matter of examples 51 or 52, and further specify that the air-interface congestion parameter is a basic service set (BSS) load parameter including station count, channel utilization, or available admission capacity.

Example 54 may include the subject matter of examples 51 or 52, and further specify that the backhaul congestion parameter is an access network query protocol (ANQP) parameter including a downlink speed of the wireless access network (WAN) backhaul link, an uplink speed of the WAN backhaul link, a downlink load of the WAN connection, or an uplink load of the WAN connection.

Example 55 may include the subject matter of examples 51 or 52, and further specify that the ANDSF QoS policy is a basic service set (BSS) load policy, a latency policy, a time to first byte (TTFB) policy, a downlink bandwidth policy, an uplink bandwidth policy, or a location policy.

Example 56 may include the subject matter of examples 51 or 52, and further include means to transmit the ANDSF QoS policy to the UE via short message service (SMS), an internet protocol (IP) level protocol, or open mobile alliance device management (OMA-DM).

Example 57 may include the subject matter of examples 51 or 52, and further specify that the ANDSF server is a server of a visited network which is different from a home network of the UE.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such element. Further, ordinal indicators (e.g., first, second or third) for identified elements are used to distinguish between the element, and do not indicate or imply a required or limited number of such elements, nor do they indicate a particular position or order of such elements unless otherwise specifically stated.

What is claimed is:

1. An apparatus comprising:
   one or more processors; and
   one or more non-transitory computer-readable media that includes instructions that, upon execution of the instructions by the one or more processors, are to cause the apparatus to:
   identify a received air-interface congestion parameter of an access point in a wireless local area network (WLAN);
   identify a backhaul congestion parameter of the access point;
   identify, based at least in part on a comparison of the air-interface congestion parameter or the backhaul congestion parameter to an access network discovery and selection function (ANDSF) quality of service (QoS) policy that includes a time to first byte (TTFB) policy, that the access point is a preferred access point; and
   facilitate, based at least in part on an identification of the access point as a preferred access point, transmission of an access request to the access point.

2. The apparatus of claim 1, wherein the ANDSF QoS policy is received from an ANDSF server.

3. The apparatus of claim 2, wherein the ANDSF server is a local ANDSF server (L-ANDSF) communicatively coupled with a subset of user equipments (UEs) in a network comprising a plurality of UEs.

4. The apparatus of claim 1, wherein the air-interface congestion parameter is a basic service set (BSS) load parameter comprising station count, channel utilization, or available admission capacity.

5. The apparatus of claim 1, wherein the backhaul congestion parameter is an access network query protocol (ANQP) parameter comprising a downlink speed of a wireless access network (WAN) backhaul link, an uplink speed of the WAN backhaul link, a downlink load of a WAN connection, or an uplink load of the WAN connection.

6. The apparatus of claim 1, wherein the ANDSF QoS policy further includes a basic service set (BSS) load policy, a latency policy, a downlink bandwidth policy, an uplink bandwidth policy, or a location policy.

7. The apparatus of claim 1, wherein the instructions are further to identify that the access point is a preferred access point based at least in part on a name or location of the access point.

8. The apparatus of claim 1, wherein the apparatus is a user equipment (UE).

9. One or more non-transitory computer-readable media comprising instructions to, upon execution of the instructions by a user equipment (UE), cause the UE to:
   receive an air-interface congestion parameter of an access point in a wireless local area network (WLAN) or a backhaul congestion parameter of the access point;
   receive an access network discovery and selection function (ANDSF) quality of service (QoS) policy from a local ANDSF (L-ANDSF) server that is communicatively coupled with a subset of UEs in a network, wherein the subset includes a number of UEs that is less than a number of a plurality of UEs serviced by an ANDSF server in the network;

compare the air-interface congestion parameter or the backhaul congestion parameter to the ANDSF QoS policy; and transmit, based at least in part on the comparison of the air-interface congestion parameter or the backhaul congestion parameter to the ANDSF QoS policy, an access request to the access point.

10. The one or more non-transitory computer-readable media of claim 9, wherein the instructions, upon execution of the instructions by a UE, further cause the UE to receive the ANDSF QoS policy from an ANDSF server.

11. The one or more non-transitory computer-readable media of claim 9, wherein the air-interface congestion parameter is a basic service set (BSS) load parameter comprising station count, channel utilization, or available admission capacity.

12. The one or more non-transitory computer-readable media of claim 9, wherein the backhaul congestion parameter is an access network query protocol (ANQP) parameter comprising a downlink speed of a wireless access network (WAN) backhaul link, an uplink speed of the WAN backhaul link, a downlink load of a WAN connection, or an uplink load of the WAN connection.

13. The one or more non-transitory computer-readable media of claim 9, wherein the ANDSF QoS policy comprises a basic service set (BSS) load policy, a latency policy, a time to first byte (TTFB) policy, a downlink bandwidth policy, an uplink bandwidth policy, or a location policy.

14. The one or more non-transitory computer-readable media of claim 9, wherein the instructions, upon execution of the instructions by the UE, further cause the UE to identify that the access point is a preferred access point based at least in part on a name or location of the access point.

15. An access network discovery and selection function (ANDSF) server comprising:
   one or more processors; and
   one or more non-transitory computer-readable media comprising instructions that, upon execution of the instructions by the one or more processors, are to cause an apparatus to:

identify a received air-interface congestion parameter of an access point in a wireless local area network (WLAN) and a backhaul congestion parameter of the access point;

determine, based at least in part on the air-interface congestion parameter or the backhaul congestion parameter, an ANDSF quality of service (QoS) policy to identify an access point as a preferred access point; and transmit the ANDSF QoS policy to a user equipment (UE);

wherein the ANDSF server is a local ANDSF (L-ANDSF) server in a network comprising a plurality of UEs coupled with an ANDSF server, the L-ANDSF server communicatively coupled with a subset of UEs that includes a number of UEs that is less than a number of the plurality of UEs.

16. The ANDSF server of claim 15, wherein the air-interface congestion parameter is a basic service set (BSS) load parameter comprising station count, channel utilization, or available admission capacity.

17. The ANDSF server of claim 15, wherein the backhaul congestion parameter is an access network query protocol (ANQP) parameter comprising a downlink speed of a wireless access network (WAN) backhaul link, an uplink speed of the WAN backhaul link, a downlink load of a WAN connection, or an uplink load of the WAN connection.

18. The ANDSF server of claim 15, wherein the ANDSF QoS policy is a basic service set (BSS) load policy, a latency policy, a time to first byte (TTFB) policy, a downlink bandwidth policy, an uplink bandwidth policy, or a location policy.

19. The ANDSF server of claim 15, wherein the instructions are further to transmit the ANDSF QoS policy to the UE via short message service (SMS), an internet protocol (IP) level protocol, or open mobile alliance device management (OMA-DM).

20. The ANDSF server of claim 15, wherein the ANDSF server is a server of a visited network which is different from a home network of the UE.

* * * * *